(12) United States Patent
McDonald et al.

(10) Patent No.: US 6,802,278 B2
(45) Date of Patent: *Oct. 12, 2004

(54) MARKER SETTING DEVICE AND MARKER

(76) Inventors: James C. McDonald, 710 Tiara Dr., Wilmington, NC (US) 28412; Edward J. Kreul, 205 Marsh Hen Dr., Wilmington, NC (US) 28409; Stephen M. Miller, 5717 Carolina Beach Rd., Wilmington, NC (US) 28412

( * ) Notice: Subject to any disclaimer, the term of this patent is extended or adjusted under 35 U.S.C. 154(b) by 0 days.

This patent is subject to a terminal disclaimer.

(21) Appl. No.: 10/430,789

(22) Filed: May 6, 2003

(65) Prior Publication Data

US 2003/0196585 A1 Oct. 23, 2003

Related U.S. Application Data

(60) Continuation-in-part of application No. 10/223,895, filed on Aug. 19, 2002, now abandoned, which is a division of application No. 09/841,024, filed on Apr. 24, 2001, now Pat. No. 6,435,129.
(60) Provisional application No. 60/378,266, filed on May 6, 2002.

(51) Int. Cl.$^7$ ................................................ B65D 83/14
(52) U.S. Cl. .................... 116/211; 222/402.1; 239/150; 239/722
(58) Field of Search ............................... 116/63 R, 209, 116/211, 213; 222/174, 175, 191, 192, 619.2, 402.1; 239/150, 156, 532, 722; 52/103, 105

(56) References Cited

U.S. PATENT DOCUMENTS

| | | | | |
|---|---|---|---|---|
| 12,618 A | * | 4/1855 | Borden et al. | 222/191 |
| 1,700,639 A | * | 1/1929 | McGain | 239/150 |
| 2,508,104 A | * | 5/1950 | Dickensheets | 222/174 |
| 3,485,206 A | * | 12/1969 | Smrt | 222/174 |
| 3,796,353 A | * | 3/1974 | Smrt | 222/612 |
| 4,050,404 A | | 9/1977 | McMackin | |
| 4,852,512 A | | 8/1989 | Klatt | |
| 5,040,478 A | | 8/1991 | Hughes | |
| 5,518,148 A | * | 5/1996 | Smrt | 222/174 |
| 5,568,785 A | | 10/1996 | Hazen | |
| 5,769,279 A | * | 6/1998 | Smrt | 222/174 |
| 5,819,989 A | * | 10/1998 | Saraceni | 222/192 |
| 5,918,565 A | * | 7/1999 | Casas | 116/211 |
| 5,918,585 A | | 7/1999 | Blanchard | |
| 6,085,452 A | | 7/2000 | Davis | |
| 6,099,412 A | | 8/2000 | Weibye | |
| 6,102,305 A | * | 8/2000 | Chapman et al. | 239/150 |
| 6,217,253 B1 | * | 4/2001 | Eslambolchi et al. | 116/209 |
| 6,390,336 B1 | * | 5/2002 | Orozco | 222/162 |
| 2001/0038041 A1 | * | 11/2001 | Leer et al. | 239/157 |

OTHER PUBLICATIONS

Repnet, Inc. Rhino Flag Driver (Patent Pending) http://www.macmagicians.com/clients/repnet/551/551.html Original Publication Date: Unknown.

* cited by examiner

Primary Examiner—Christopher W. Fulton
Assistant Examiner—Travis Reis
(74) Attorney, Agent, or Firm—MacCord Mason PLLC

(57) ABSTRACT

A device for inserting a utility marker is described that includes an elongated handle with upper and lower ends; a marker extractor adjacent the handle lower end that is moveable along a vertical pathway, and a marker magazine adjacent the handle lower end adapted to hold a plurality of markers including a leading marker adjacent the marker extractor pathway. The extractor, when moved to its extended position by pushing on the plunger, extracts the leading marker from the marker magazine, and inserts the lower end of the marker into the ground. Simultaneously, a valve actuator at the lower end of the handle is moved to an operative position to open the valve of an aerosol can, spraying paint adjacent to the marker. In one embodiment of the invention, the magazine is adapted to enclose a continuous roll of markers. In another embodiment, a housing adjacent the marker extractor pathway receives a replaceable magazine of stacked markers.

20 Claims, 11 Drawing Sheets

Fig. 4
Fig. 5
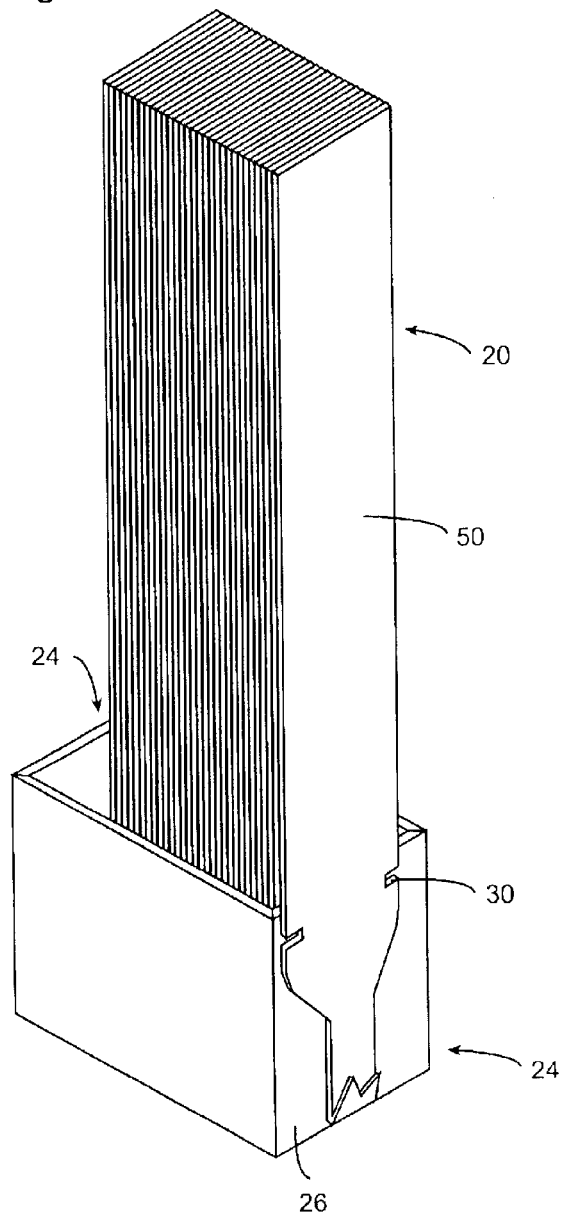
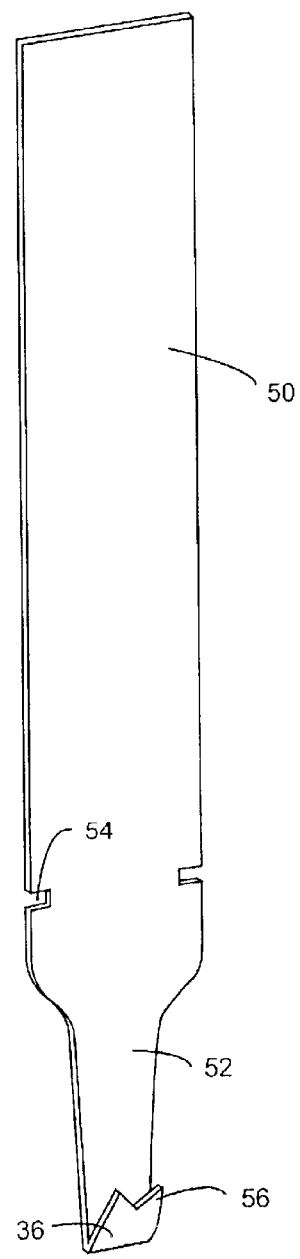

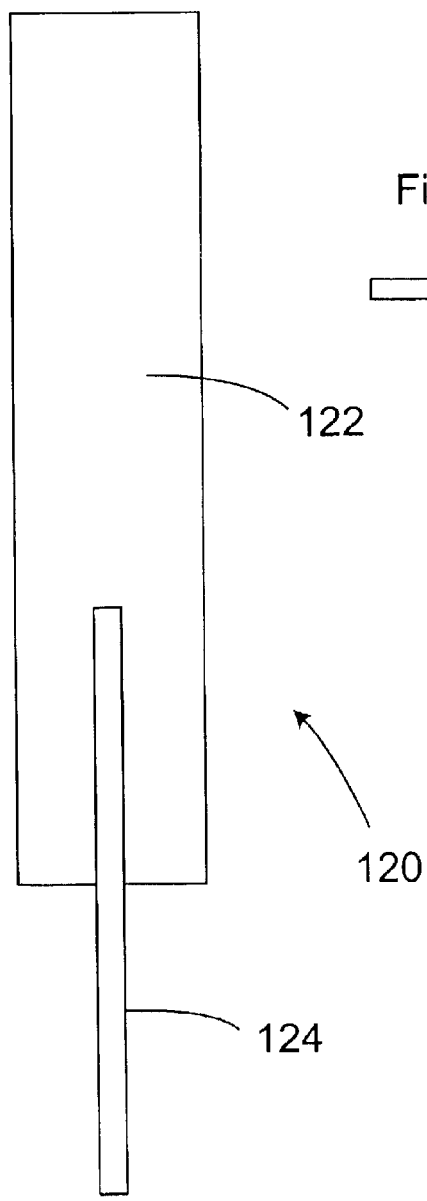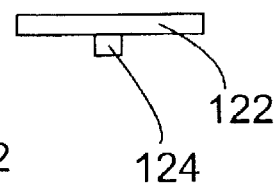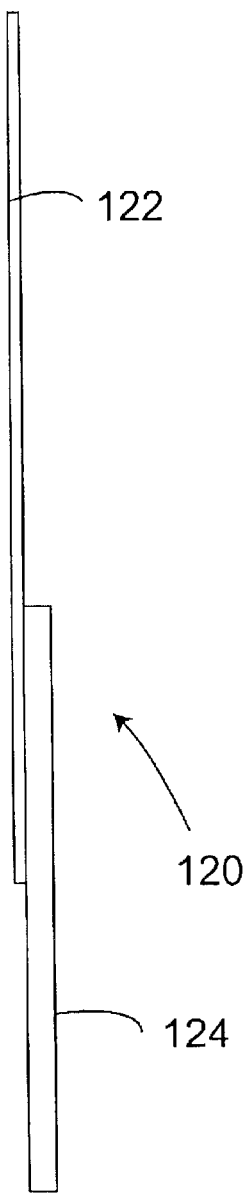

MARKER SETTING DEVICE AND MARKER

This application claims the benefit of U.S. Provisional Application Ser. No. 60/378,266, filed May 6, 2002. This application is also a continuation-in-part of application Ser. No. 10/223,895, filed Aug. 19, 2002, now abandoned which is a division of U.S. patent application Ser. No. 09/841,024, filed Apr. 24, 2001, entitled MARKER SETTING DEVICE AND MARKER, now U.S. Pat. No. 6,435,129.

BACKGROUND OF THE INVENTION (1) Field of the Invention

The present invention relates generally to a device for setting utility markers into the ground, and a unique utility marker, and in particular to a device that can be used to set utility markers without the need for the worker to bend over.

(2) Description of the Prior Art

The location of underground utility supply lines, the term including gas, water, sewer, electrical power, telephone, cables, and other lines or conduits used to provide services to a residence or other building, must be identified prior to excavation in the area where such lines are located. Most municipalities and utility companies provide a free or low cost service to locate these utility lines. Once the lines are located, it is the common practice to mark the location of the lines, so that they will not be accidentally damaged.

Utility lines are commonly marked in two ways. First, markers, also known as flags, are inserted into the ground above the line, with each marker having an above ground signal section, and a below ground post or anchoring section. While most markers are comprised of a flexible wire with a small plastic flag at the top end, other markers have been proposed in the prior art.

The signal section of the marker is of a particular color to designate the type of utility line being marked. For example, orange is used to designate telephone lines, yellow is for gas, blue is for water, red is for electrical lines, etc. In addition, the area is commonly sprayed with a biodegradable paint of the same color.

When marking a utility line, the worker must bend over to insert each marker into the ground, and then bend over again to spray the area with an aerosol can. Since numerous markers are frequently required to mark utility lines, this effort can become laborious, as well as time consuming. In addition, the worker must carry several markers and one or more aerosol cans, with selection of a marker from the holder in which they are carried adding to the length of time required to mark the utility line.

The prior art recognizes this problem and has proposed devices to reduce the physical effort and time required to mark utility lines. For example, U.S. Pat. No. 5,769,279 to Smrt describes a device comprised of an elongated handle with an aerosol can holder at the lower end of the handle to hold a spray can in the inverted position. An operating trigger at the upper end of the handle is in communication with a valve actuator that can be extended to engage an aerosol can valve, thereby releasing spray from the can while the trigger is depressed. As a result, bending over to spray the ground is avoided.

The Smrt device also includes a pointed rod or stake member at the lower end of the handle. The rod is inserted into the ground to make a hole for the marker, which is carried separately by the operator. The operator must then bend over to insert the lower end of the marker into the hole.

A similar device is described in U.S. Pat. No. 5,918,565 to Casas. The Casas device is similar to the Smrt device in that it is comprised of a handle with an aerosol can holder at the lower end of the handle and a trigger at the top, which communicates with a valve actuator. A pointed rod is also provided to make a hole for marker insertion. Essentially the only difference between the Smrt and Casas devices is that Casas also provides a receptacle in the form of a tube at the upper end of the handle for holding a plurality of flags. The operator, after making a hole, removes a flag from the receptacle, and then bends over to insert the flag into the hole.

While the prior art, and in particular the above Smrt and Casas patents, have addressed the need for a device for spraying a utility line area with an aerosol can without the necessity of bending over, there is still a need for a device that will facilitate insertion of utility markers without the need to bend over. There is also a continuing need for a device that can be used to simultaneously insert a marker and spray an adjacent area without the need to bend over, thus materially reducing the labor intensity of the job, as well as substantially reducing the time required to mark an area.

SUMMARY OF THE INVENTION

The present invention addresses this need by providing a utility marker insertion device that can be used to insert a utility marker from a standing position. In addition, the present invention provides for a utility marker insertion device that can be used to simultaneously insert a utility marker and spray the area from an aerosol can while the operator is in a standing position. Further, the invention provides for a utility marker that is uniquely suitable for use with the device of the present invention. It will also be apparent from reading the following description that the setting device of this invention is suitable for inserting markers for other purposes, such as boundary identification.

Generally, the utility marker insertion device is comprised of an elongated handle that has an upper end and a lower end, a marker magazine adjacent the lower end of the handle to hold a plurality of markers, and a marker extractor at the lower end of the handle that is moveable along a marker extractor pathway between a raised position and a lowered or extended position in which the lower end of the marker extractor extends beyond the lower end of the handle, whereby a leading marker from the magazine is removed from the magazine and inserted into the ground when the marker engagement member is moved to its extended position, with the lower end of the handle being against the ground surface.

The marker magazine is comprised of a housing that is releasibly attachable adjacent the lower end of the handle, and is adapted to hold a plurality of markers, the marker adjacent the marker extractor pathway being designated as the leading marker. The housing includes a front wall with a discharge opening, and may include a resilient member to urge markers within the housing toward the discharge opening. The markers, to be described in greater detail hereinafter, may be held in a stacked, back-to-back relationship with the leading marker of the stack being at the discharge opening.

Instead of being separately inserted, the markers may be packaged in a replaceable magazine, preferably made of disposable cardboard or plastic, that is inserted into the housing. When the markers are exhausted, the user simply removes the empty magazine and inserts a new magazine. The housing may include a hinged or otherwise removable cover over an opening for insertion of the magazine.

Alternatively, the markers may be provided as a continuous roll, with the tip of the forward marker projecting transversely into the extractor pathway so that the tip of the extractor engages the tip of the leading marker to pull it from the magazine. Each marker may include an extractor receiver to aid in engagement of the extractor tip with the marker. The marker extractor receiver is selected from the group consisting of tips, projections, depressions and holes.

The marker magazine may entirely enclose the markers, or the upper sections of the markers may at least partially project from the top of the housing. In order to align the markers, one or more guide members may project inwardly from the sides of the housing and into slots or grooves in the edges of the markers. Each of the markers may also include an extractor receiver extending toward the marker extractor, with the extractor receiver of the leading marker extending into the marker extractor pathway, so that the lead marker is caught by the leading edge of the marker extractor when the marker extractor is extended, thereby pulling the marker from the magazine.

The device handle preferably is comprised of a tubular lower handle section with upper and lower ends, and a plunger with upper and lower ends slidable within the lower handle section. The plunger has a raised position in which the upper end of the plunger is above the lower handle section, and a lowered position in which the plunger is further inserted into the lower section. A spring or other resilient member is positioned with the handle to urge the plunger to the raised position. A foot or striker plate is attached to the bottom of the handle, to contact the ground when a marker is to be inserted into the ground. The upper end of the plunger can include a handgrip for ease of use.

With this handle configuration, the marker extractor is preferably attached to the plunger adjacent the plunger lower end, while the marker magazine is attached to the outer surface of the lower tubular section adjacent the lower end of the tubular section. A vertical extractor slot within the tubular section wall extends from the lower end of the tubular section, with the marker extractor being moveable within the extractor slot. The magazine is removably mounted on the exterior of the tubular housing, with its discharge opening being aligned with the extractor slot.

The marker extractor includes a lower end, which is preferably beveled, that is above the lower portion of the pathway when the extractor is in the raised position. The magazine is positioned so that the lead marker extends into the lower portion of the pathway and beneath the lower end of the raised extractor. When the extractor is extended, e.g., by pushing downward on the plunger to which it is attached, the lower end of the extractor engages the tip of the marker, pulling the lead marker from the magazine.

If the lower end of the handle is on the ground, full movement of the extractor to its extended position, in one embodiment of the invention, extends the lower end of the extractor into the ground, thereby inserting the lower end of the marker into the ground. As described later, anchor tabs may be included on the marker to hold the marker in the ground, as the extractor is withdrawn to its raised position for extraction of the next leading marker. In an alternative embodiment of the invention, the marker may include a rigid lower member, eliminating the need for the extractor to extend below ground level.

The marker setting device may also include an aerosol can carrier that is attached at the lower end of the handle to support an aerosol can with a valve in the inverted position, and a valve actuator having an operative position to open the aerosol can valve. Preferably, the valve actuator is moved to the operative position as the extractor is moved to the extended position, thereby simultaneously inserting a marker and spraying the adjacent area.

For example, utilizing a handle of the above-described configuration, the valve actuator can include a rod having a distal valve engagement end, and a proximal end, with a spring or other resilient member urging the rod in the direction of the proximal end to a retracted position. The rod, when in the extended position, contacts the valve of an aerosol can held by the can holder to open the valve, and thereby spray paint.

The valve actuator is preferably moved from the inoperative or retracted position to the operative or extended position by a plunger component that engages the proximal end of the rod as the plunger is moved to its fully lowered position. For example, an inclined camming surface can extend outwardly from the lower end of the plunger, preferably opposite the position of the marker extractor. The camming surface extends through a camming surface slot adjacent the lower end of the lower handle section, with the proximal end of the valve actuator rod being adjacent the slot. As the plunger is moved downwardly, as when extracting a marker, the camming surface pushes the rod outwardly to push the distal end of the rod against the aerosol can valve.

Thus, when the device is operated with the optional aerosol can carrier, the worker places the foot or lower end of the handle against the ground where the marker is to be inserted and, while standing in an upright position, simply pushes downwardly on the plunger. As the plunger moves to its fully lowered position, the marker extractor engages the extractor receiver of the leading marker, pulling the marker from the magazine and inserting the lower end or post section of the marker into the ground. At the same time, the camming surface moves the valve actuator to its extended position, opening the aerosol can valve, and spraying paint onto the ground adjacent the lower end of the handle.

The worker then simply lifts the device and moves the lower end to the next place where a marker is to be inserted. The procedure can be rapidly and easily repeated until the marker magazine or the aerosol can is empty. The empty magazine can be quickly replaced, as can the aerosol canister. Thus, a plurality of markers can be rapidly inserted and the adjacent area spray-painted without the need for the worker to bend over.

The exact configuration of the utility marker dispensed from the marker magazine will depend upon the corresponding configuration of the magazine housing and the discharge opening, as well as the desired end use and preferences of the designer. For example, the marker may be comprised of an upper signal section having at least one planar surface, a longitudinal axis, opposed sides, an upper end and a lower end; a lower post section having a lower end and an upper end attached to the lower end of the signal section; and an extractor receiver extending outwardly and upwardly from the post section.

A marker of this configuration may be cut from a single sheet of flexible plastic or paper, with the extractor projection being folded upwardly at the lower end of the lower post section. Due to the resilience of the material, the fold between the post section and the extractor projection will act like a living hinge, so that the extractor projection will fold against the post section when the marker is between other markers. However, when no other marker is in front of the given marker, i.e., when the marker becomes the leading marker of the stack, the extractor projection will flex outwardly for engagement by the extractor.

In the preferred design, the signal member is generally flat with opposed planar faces that are substantially wider than the edges of the signal section, although other configurations, such as tubular signal members, are also contemplated. Also, the signal section will be substantially wider than the post section, e.g., the signal section is preferably at least twice the width of the post section. Thus, in embodiments where the signal and post sections are integrally formed with a common central axis, a shoulder may be formed where the lower end of the signal section joins the upper end of the post section. The marker may also include guide slots extending inwardly from either side of the marker to position the marker within the magazine.

If the marker design includes an extraction projection, the projection preferably extends upwardly and outwardly from the lower end of said post section to ensure engagement by the lower end of the extractor. Further, the distal end of the extraction projection may include upwardly extending points or tips to anchor the marker in the ground once it is inserted.

Markers may also be provided as a continuous roll, with each lead marker being separable from its immediately trailing marker when the lead marker is inserted into the ground. This separation may be effected by perforations between the markers, by cutting of the markers at their interface with a segment of the extractor, or by other means. Generally, each marker will taper inwardly at its lower end to join the upper end of the leading marker. A hole or indentation may be present in the lower end of the marker to facilitate engagement of the extractor.

In another embodiment, the marker may be comprised of separately formed signal and post members that are joined to form the marker. For example, the signal member may be formed of a flexible plastic sheet or tube, while the post member is formed of a rigid plastic or metal rod that is longitudinally attached to the lower end of the signal member. This configuration permits insertion of the post section without insertion of the extractor into the ground, which may be difficult with hard ground conditions. For example, the extractor may engage the top or upper portion of the rigid post section instead of the lower end of the post.

BRIEF DESCRIPTION OF THE DRAWINGS

FIG. 4 is a perspective view of the marker magazine as seen from the front.

FIG. 5 is a perspective view of a marker.

FIG. 10 is a front view of a marker formed of a flexible flag section and a rigid post section.

FIG. 11 is a top view of the marker of FIG. 10.

FIG. 12 is a side view of the marker of FIG. 10.

DETAILED DESCRIPTION OF THE INVENTION

Figure 1:
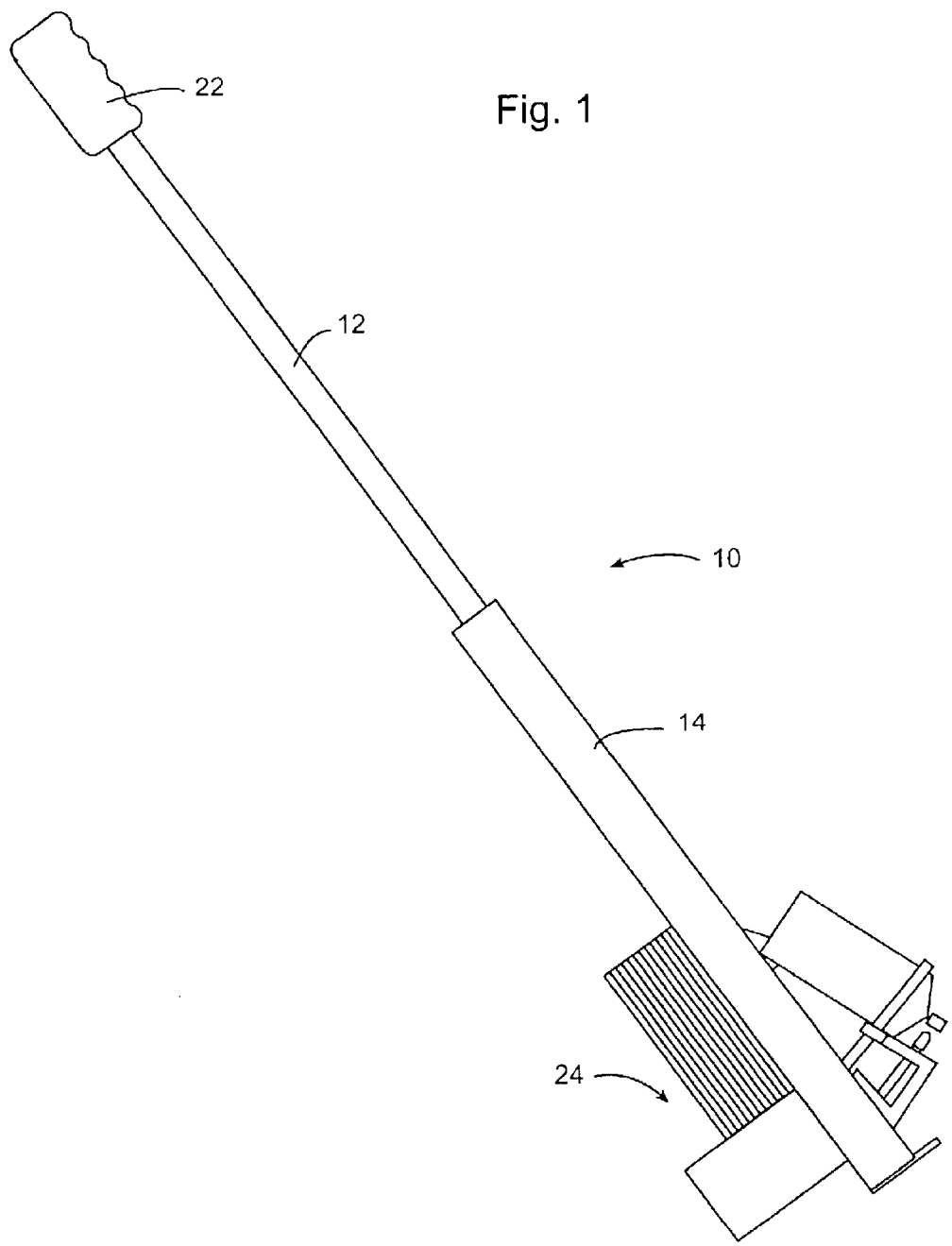
FIG. 1 is a perspective view of the marker setting device.
Figure 2:
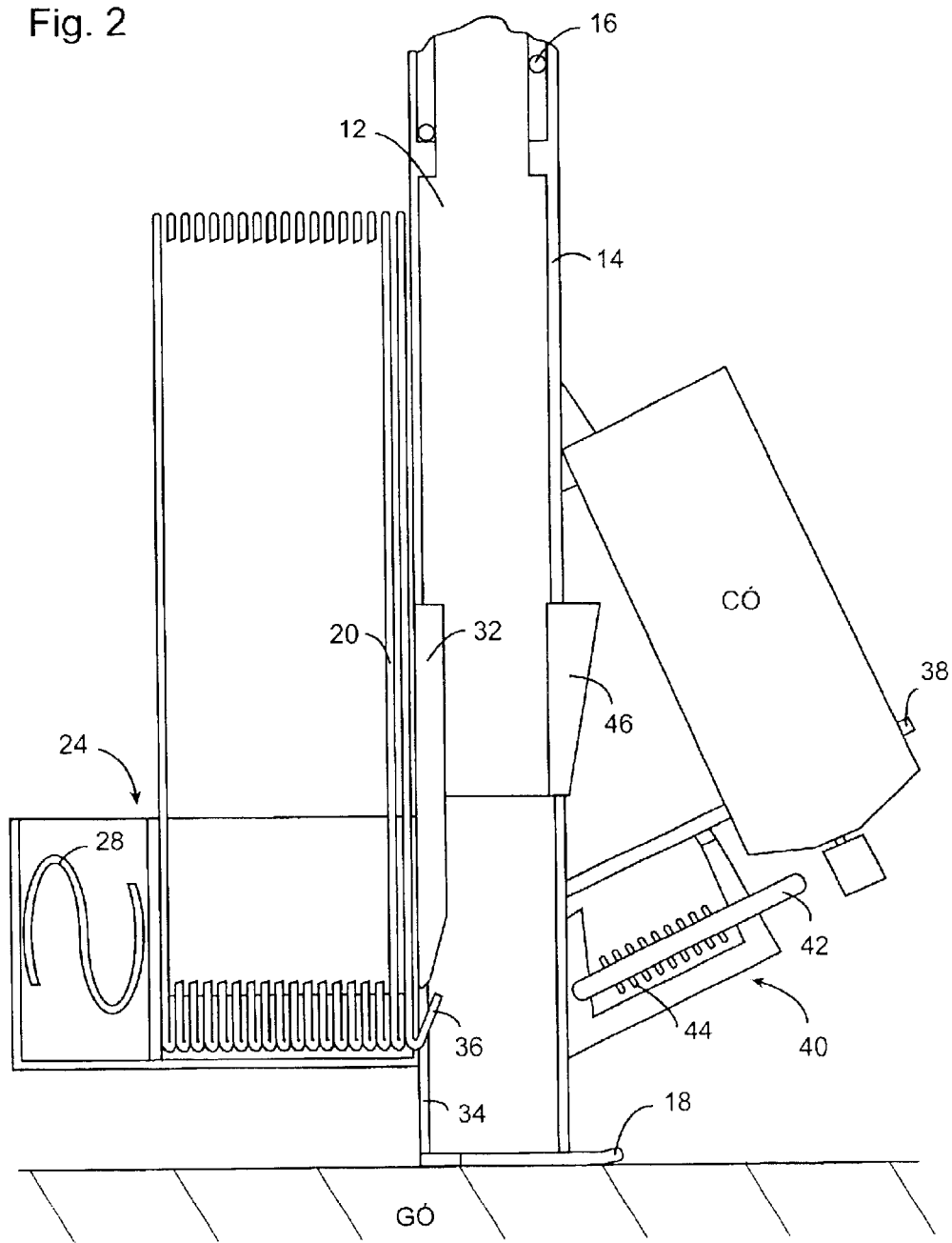
FIG. 2 is a sectional side view of the lower section of the marker setting device with the plunger in the raised position.
Figure 3:
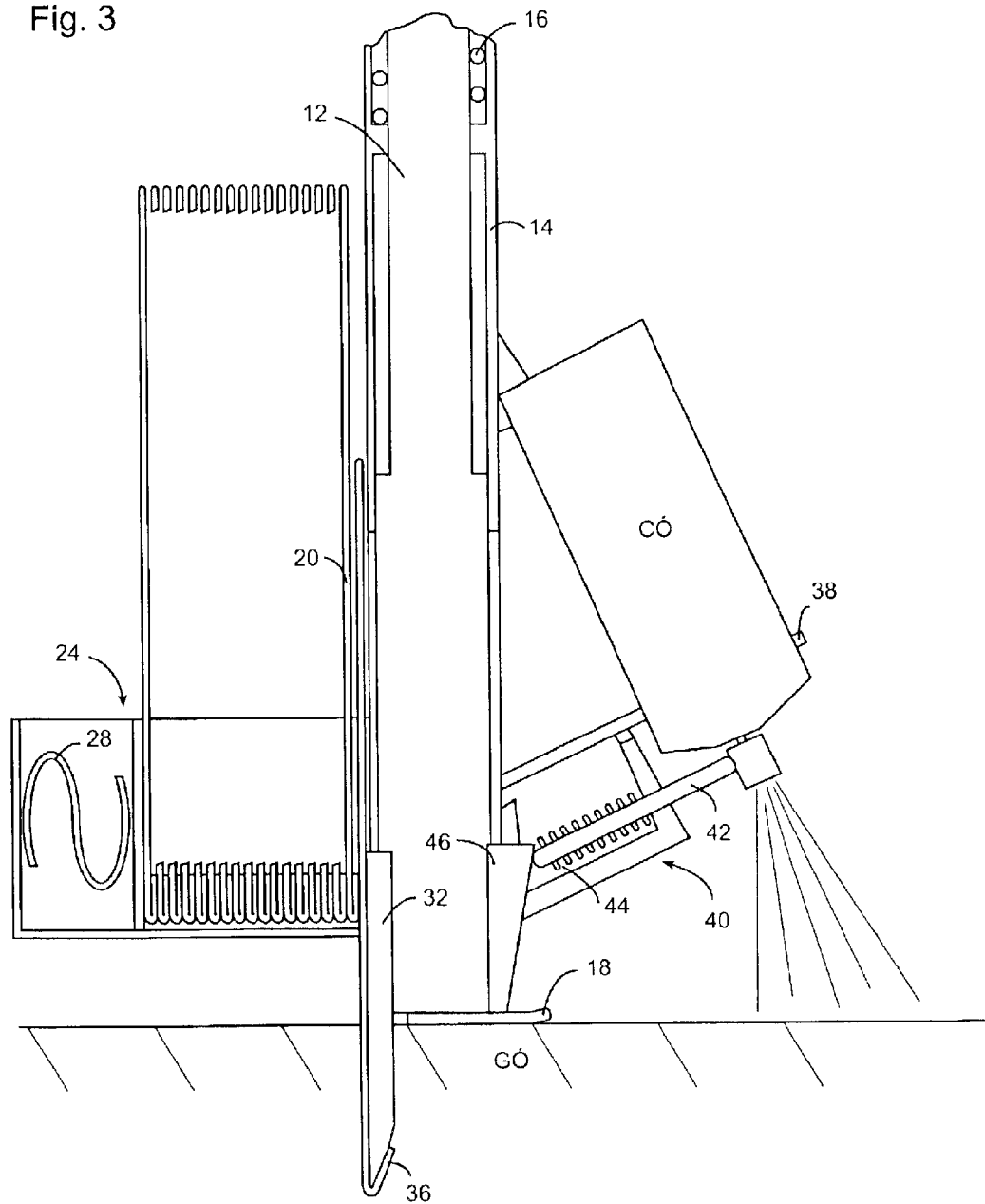
FIG. 3 is a sectional side view of the lower section of the marker setting device with the plunger in the extended position and a marker inserted into the ground.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

The preferred marker setting device, generally 10, of the present invention is comprised of upper handle section or plunger 12 that is moveable between raised and lowered positions within tubular lower handle section 14. Spring 16 is positioned between plunger 12 and lower handle section 14 to urge plunger 12 toward its raised position. Foot 18 is attached to the bottom of handle section 14 to rest against the ground "G" when marker 20 is inserted. A handgrip 22 is fitted onto the upper end of plunger 12.

Marker magazine, generally 24, is releasibly attached to handle section 14, and is adapted to hold a stack of markers 20, with the marker closest to handle section 14 being designated as the leading marker. Magazine 24 includes front wall 26 with a discharge opening having generally the profile of marker 20, and a spring 28 to urge markers 20 through the discharge opening. Front wall 26 includes alignment guides 30 to align markers 20.

Marker extractor 32 is attached to the lower end of plunger 12 and extends through vertical slot 34 in the lower end of tubular handle section 14 to engage leading marker 20. Marker extractor 32 includes a beveled lower end having an exterior profile generally conforming to the inner profile of the lower end of marker 20. Extractor 32 is raised to the upper end of slot 34 when plunger 12 is raised, and is moved to an extended position beyond the lower end of lower handle section 14 when plunger 12 is pushed fully downward.

When extractor 32 is in its raised position, extractor projection or tab 36 of leading marker 20 extends into the lower portion of slot 36 beneath extractor 32, and thus into the pathway of extractor 32. When plunger 12 is pushed fully downward, extractor 32 is moved to its extended position, engaging tab 36, thereby pulling leading marker 20 from magazine 24 and inserting the lower end of marker 20 into ground "G".

In the preferred embodiment, marker setting device 10 also includes an aerosol can carrier 38 attached at the lower end of handle section 14, opposite magazine 24 to support a valved aerosol can "C" in an inverted position, and a valve actuator 40 having an operative position to press against the valve of can "C", and a retracted position. In the preferred embodiment, valve actuator 40 moves to its operative position when extractor 32 is moved downward to its extended position, thereby simultaneously inserting a marker 20 and spraying the adjacent area with paint.

As illustrated, valve actuator 40 includes a rod 42 with a distal valve engagement end, and a proximal end, and a spring 44 urging the rod in the direction of the proximal end.

Valve actuator is moved to its operative position by contact with an outwardly extending inclined camming surface 46 carried at the end of plunger 12 opposite marker extractor 20 that engages the proximal end of rod 42 through vertical camming slot 48.

Marker 20 is preferably formed of a single sheet of a flexible material, e.g., a sheet of plastic or heavy paper, and is generally comprised of an upper signal section 50, and a lower post section 52. An extractor receiver or tab 36 is formed by bending the lower end of section 52 outwardly and upwardly. Resilient tab 36 is folded against section 52 when marker 20 is stacked behind another marker, but is permitted to flex outwardly when the given marker becomes the lead marker. Signal section 50 is wider than post section 52, so that the outer lower edges of the lower end of signal section 50 form shoulders connecting the two sections. The side edges of marker 20 also include guide slots 54 to position marker 20 within magazine 24. Tab 36 includes tips 56 to anchor marker 20.

Thus, when setting device 10 is operated with the aerosol sprayer, the operator places the foot 18 against the ground where marker 20 is to be inserted and pushes downwardly on plunger 12. As plunger 12 moves to its fully lowered position, marker extractor 32 engages extractor receiver 36 of leading marker 20, pulling marker 20 from magazine 24 and inserting marker post section 52 into the ground. Simultaneously, camming surface 46 moves rod 42 to its extended position against the valve of can "C" to spray paint adjacent the inserted marker. In this manner, a plurality of markers can be inserted and the adjacent area spray-painted in a short time with minimal physical exertion.

Figure 6:
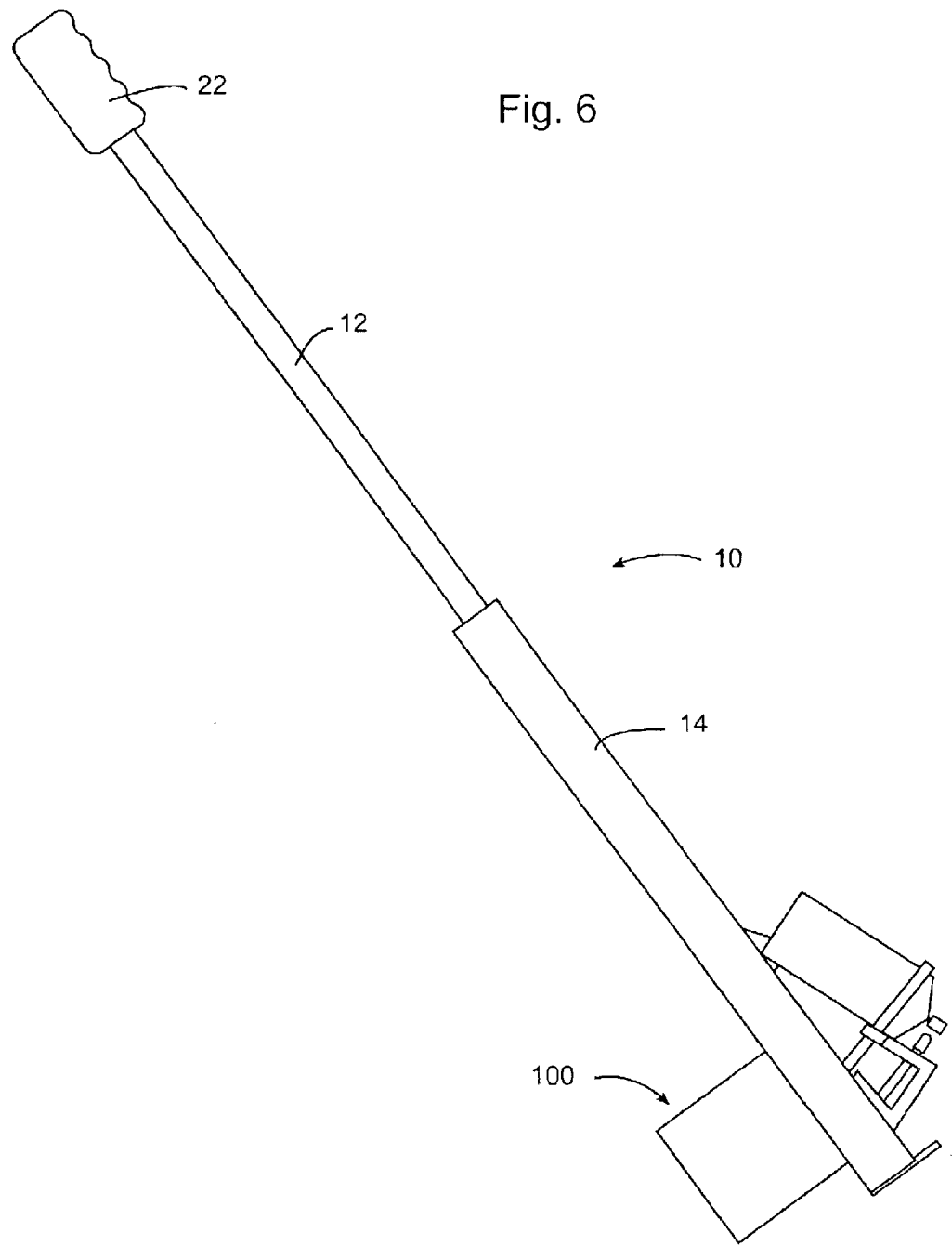
FIG. 6 is a perspective view of the marker setting device with an alternative feed magazine.
Figure 7:
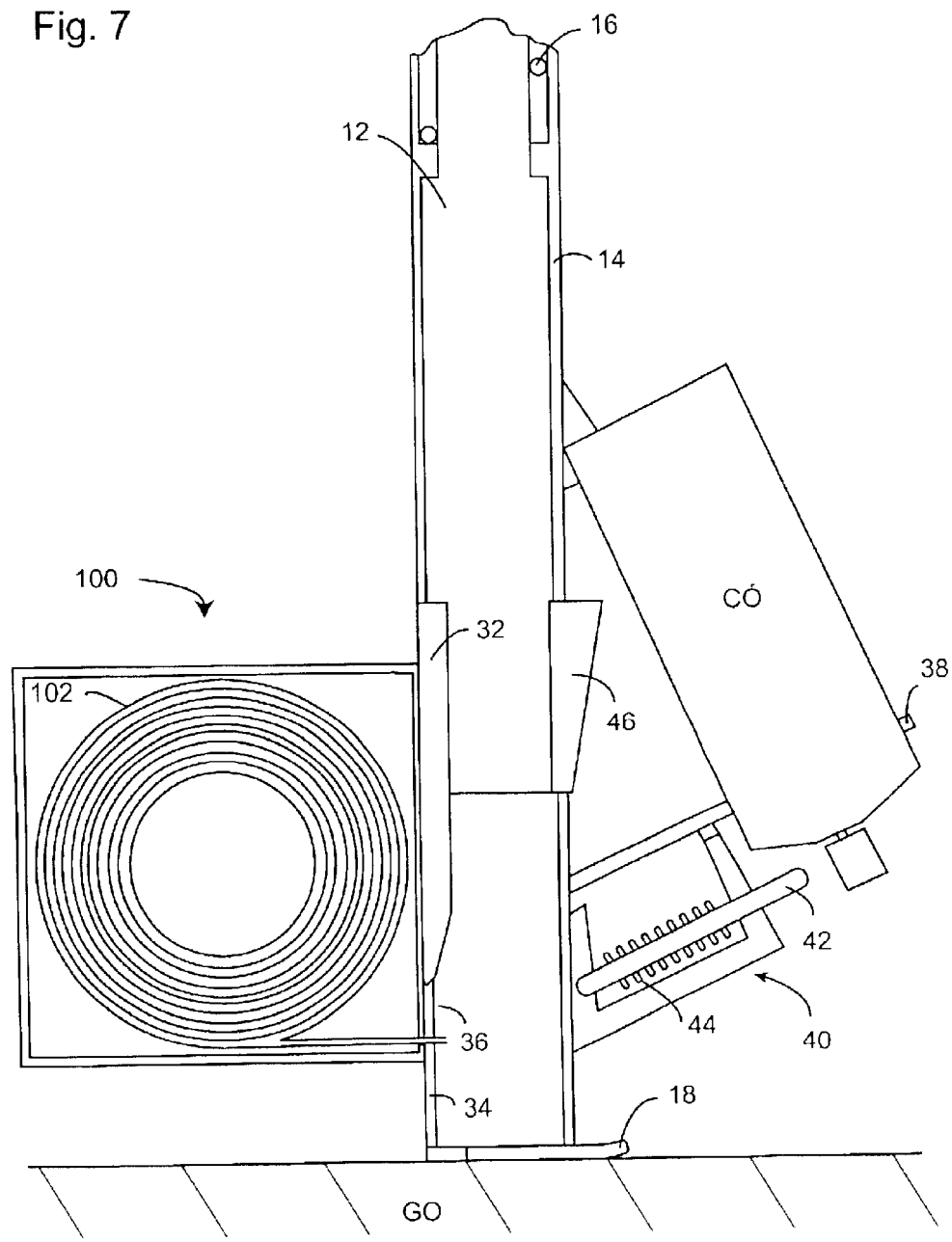
FIG. 7 is a sectional side view of the lower section of the marker setting device of FIG. 6 with the plunger in the raised position.
Figure 8:
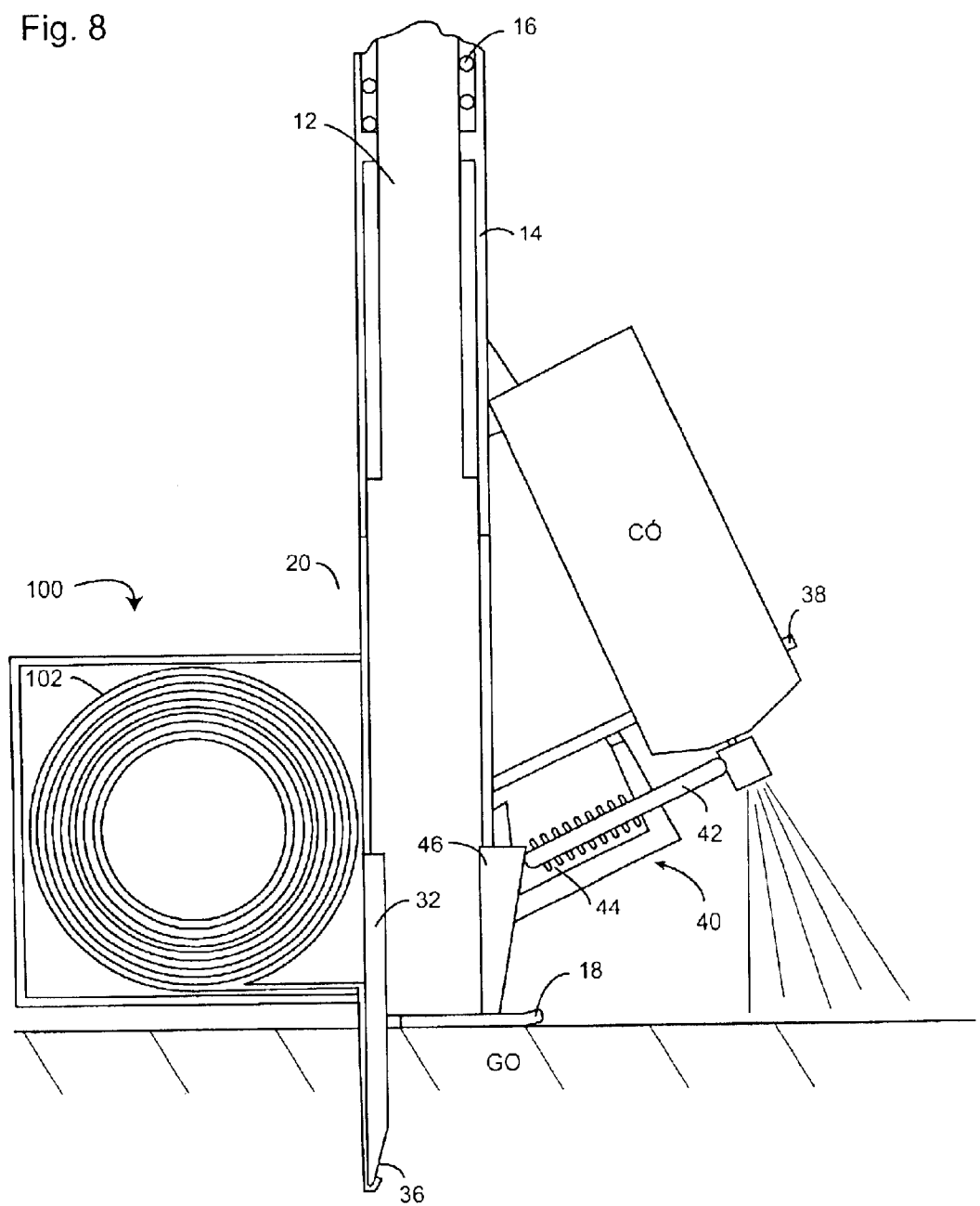
FIG. 8 is a sectional side view of the lower section of the marker setting device of FIG. 6 with the plunger in the extended position and a marker inserted into the ground.
Figure 9:
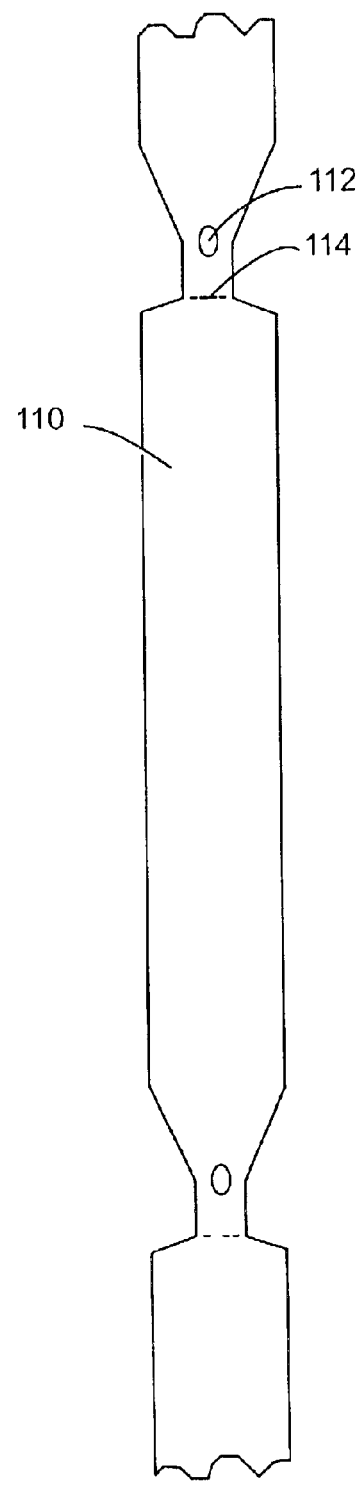
FIG. 9 is a top view of a section of a strip of markers used in a continuous roll magazine.

FIGS. 6–8 illustrate a marker device utilizing an alternative marker magazine, generally 100, to enclose a continuous roll of markers 102. One form of marker suitable for this purpose is illustrated in FIG. 9. Markers 110 are fed transversely to the pathway of extractor 32, which engages the tip of each leading marker, pulling it downward as extractor 32 is extended. Each marker 110 includes a hole 112 for insertion of the tip of extractor 32 to facilitate extraction. Perforations 114 separate the markers for ease of separation.

FIGS. 10–12 illustrate yet another marker 120, constructed of a rectangular, planar flag section 122 and a rigid rod-like post section 124 attached to, and longitudinally aligned with, section 122. The post section may also include fixed or expandable barbs to secure the marker in place. With this configuration, section 124 can be readily inserted into even hard ground, with extractor 32 pushing on the top of upper section of section 124, avoiding the necessity of inserting extractor 32 below ground level.

Figure 13:
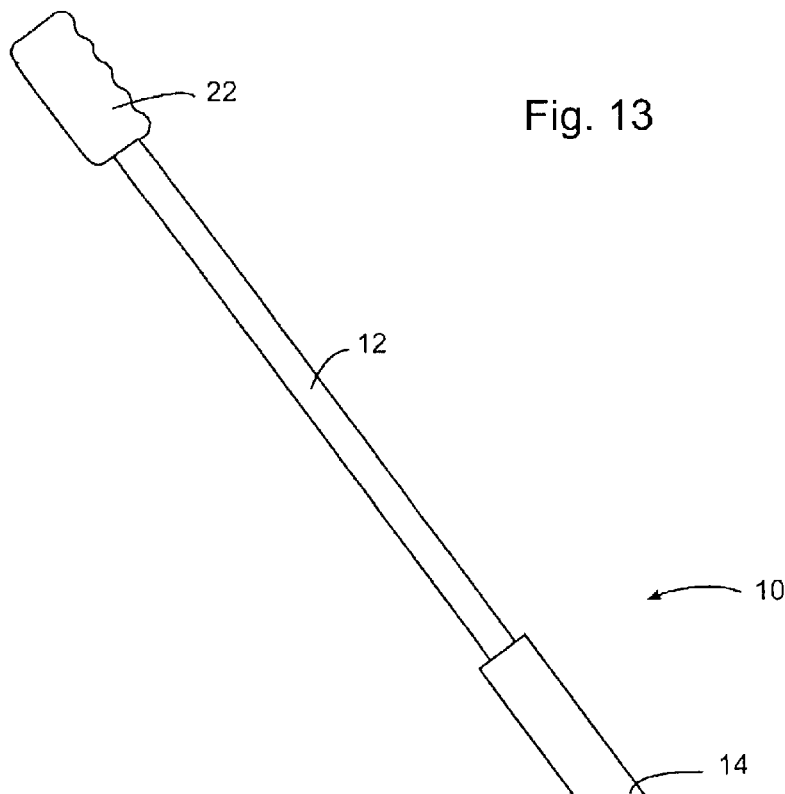
FIG. 13 is a side view of the setting device with a housing adapted to receive a replaceable magazine.
Figure 14:
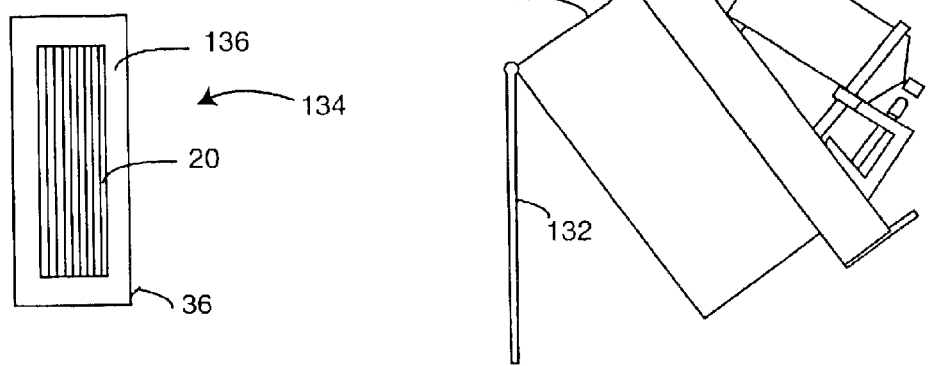
FIG. 14 is a side view of a replaceable magazine.
Figure 15:
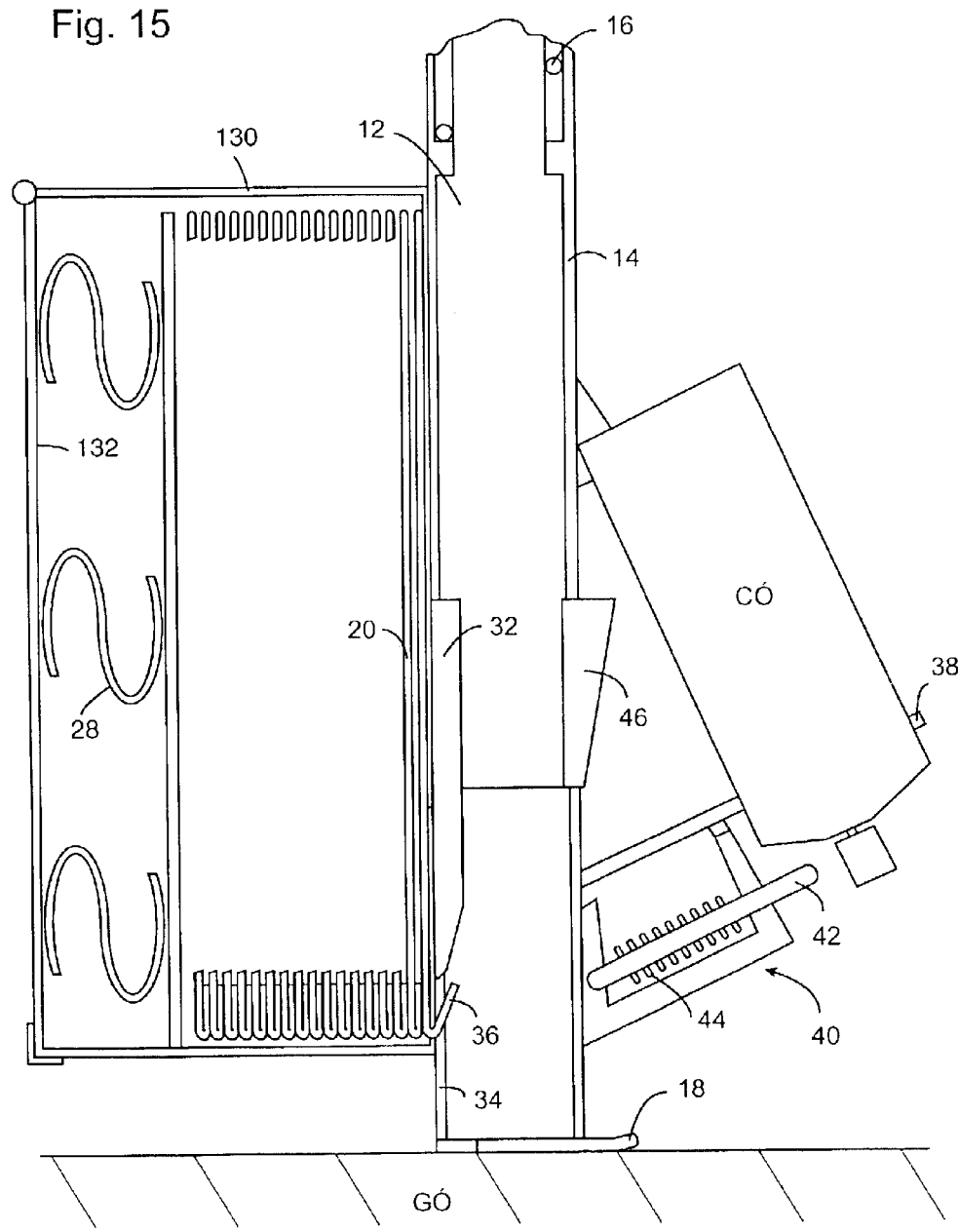
FIG. 15 is a sectional side view of a part of the setting device illustrating the interior of the housing and replaceable magazine.

FIG. 13 illustrates an alternative embodiment of setting device 10 that includes a housing 130 with a hinged cover 132 for receiving the replaceable magazine 134 illustrated in FIG. 14. Magazine 134 is comprised of a holder 136, which may be of a disposable material, or of a more permanent material, such as metal, if magazine 134 is to be refilled. Holder 136 encloses a stack of markers 20, with tab 36 of the leading marker extending from holder 136. FIG. 15 illustrates setting device 10 incorporating housing 130 and magazine 134.

Instead of using the device previously described, it will be understood that the different markers described herein may be inserted using other devices and techniques. For example, the force of insertion can be achieved with a mechanical lever assisted by a means such as a gas-driven cylinder, electrical solenoid, etc.

Certain modifications and improvements will occur to those skilled in the art upon a reading of the foregoing description. It should be understood that such modifications and improvements have been deleted herein for the sake of conciseness and readability but are properly within the scope of the following claims.

What is claimed is:

1. A marker setting device for inserting a marker into the ground comprising:
   a) an elongated handle having an upper end and a lower end;
   b) a marker extractor adjacent the lower end of said handle, said marker extractor being movable along a marker extractor pathway between a raised position and an extended position, said marker extractor having a lower end extending beyond said handle lower end when said marker extractor is in the extended position; and
   c) a marker magazine adjacent said handle lower end adapted to enclose a continuous roll of markers including a leading marker adjacent said marker extractor pathway, each of said markers including an extractor receiver, the extractor receiver of said leading marker extending into said marker extractor pathway, whereby said leading marker extractor receiver is engaged by said marker extractor to extract said marker from said magazine when said plunger is moved from its raised position to its fully extended position.

2. The marker setting device of claim 1, wherein said handle includes a tubular lower handle section with upper and lower ends, a plunger with upper and lower ends slidable in said lower handle section between a raised position and a lowered position, and a resilient member urging said plunger to said raised position, said marker extractor being carried adjacent the lower end of said plunger.

3. The marker setter of claim 1, further includes an aerosol can carrier attached at the lower end of said handle, and a valve actuator in communication with said handle, said valve actuator having an operative, position to engage a valve on a spray can carried by said can carrier.

4. The marker setting device of claim 1, wherein said extractor receiver is selected from the group consisting of tips, projections, depressions and holes.

5. The marker setting device of claim 1, wherein said handle includes a striker foot on its lower end.

6. The marker setter of claim 1, wherein said lower handle section includes a first vertical slot at its lower end, said marker engagement member being moveable within said slot.

7. A marker setting device comprising:
   a) an elongated handle having an upper end and a lower end, said handle including a tubular lower handle section with upper and lower ends, a plunger with upper and lower ends slidable in said lower handle section between a raised position and a lowered position, and a spring urging said plunger to said raised position;
   b) a marker extractor attached to the lower end of said plunger, said marker extractor being movable along a marker extractor pathway between a raised position and a lowered position, said marker extractor having a lower end extending beyond said lower handled section lower end when said marker extractor is in its extended position; and
   c) a housing attached to said lower handle section, said housing being adapted to receive a replaceable magazine containing a plurality of stacked markers including a leading marker that is placed adjacent said marker engagement pathway whenever said replaceable magazine is received by said housing, each of said markers including an extractor receiver, the extractor receiver of said leading marker extending into said marker engagement pathway whenever said replaceable magazine is housed within said housing, whereby said lead marker is engaged by said marker extractor to extract said marker from said magazine when said plunger is moved from its raised position to its fully lowered position.

8. The marker setter of claim 7, further including an aerosol can carrier attached at the lower end of said handle, and a valve actuator in communication with said plunger, said valve actuator having an operative position engaging said valve when said plunger is in the lowered position.

9. The marker setter of claim 7, said housing includes a front wall having a discharge opening attachable adjacent said marker extractor pathway and a hinged door having an attached spring to urge markers within said replaceable magazine toward said discharge opening.

10. The marker setter of claim 7, wherein said handle includes a striker foot on its lower end.

11. The marker setter of claim 7, wherein said lower handle section includes a first vertical slot at its lower end, said marker engagement member being within said slot.

12. The marker setter of claim 7, wherein said marker is comprised of an upper signal section having at least one planar surface, a longitudinal axis, opposed sides, an upper end and a lower end; a lower post section having a lower end and an upper end attached to the lower end of the signal section; said extractor receiver extending outwardly and upwardly from the post section.

13. The marker setting device of claim 7 wherein said extractor receiver is selected from the group consisting of tips, projections, depressions and holes.

14. A marker setting device for inserting a marker into the ground comprising:
  a) an elongated handle having an upper end and a lower end;
  b) a marker extractor adjacent the lower end of said handle, said marker extractor being movable along a marker extractor pathway between a raised position and an extended position, said marker extractor having a lower end extending beyond said handle lower end when said marker extractor is in its extended position;
  c) a marker magazine adjacent said handle lower end adapted to hold a continuous roll of markers including a leading marker adjacent said marker extractor pathway, each of said markers including an extractor receiver, the extractor receiver of said leading marker extending into said marker extractor pathway, whereby said leading marker is engaged by said marker extractor to extract said marker from said magazine when said plunger is moved from its raised position to its extended position; and
  d) an aerosol can carrier attached at the lower end of said handle, said carrier being adapted to support a valved aerosol can, and a valve actuator in communication with said handle, said valve actuator having an operative position to engage a valve on a spray can carried by said can carrier when said marker extractor is in the extended position.

15. The marker setting device of claim 14, wherein said handle includes a tubular lower handle section with upper and lower ends, and a plunger with upper and lower ends slidable in said lower handle section between a raised position and a lowered position.

16. The marker setting device of claim 14, wherein said valve actuator includes a rod with a distal valve engagement end, and a proximal end and a spring urging said rod in the direction of the proximal end.

17. The marker setting device of claim 14, wherein said valve actuator is moved to its operative position by contact with an outwardly extending inclined camming surface carried at the end of a plunger opposite said marker extractor.

18. The marker setting device of claim 14, wherein each lead marker is separable from its immediately trailing marker when said lead marker is inserted into the ground.

19. The marker setting device of claim 18, wherein marker separation is effected by perforations between said markers and by cutting of said markers at their interface with a segment of the extractor.

20. The marker setting device of claim 14, wherein said marker extractor receiver is selected from the group consisting of tips, projections, depressions and holes.

* * * * *